(12) United States Patent
Cho

(10) Patent No.: US 6,845,441 B2
(45) Date of Patent: Jan. 18, 2005

(54) USER INITIATED MICROCODE MODIFICATION

(75) Inventor: Dong Soo Cho, Kyungki-do (KR)

(73) Assignee: LG Semicon Co., Ltd., Chungcheongbuk-do (KR)

(*) Notice: Subject to any disclaimer, the term of this patent is extended or adjusted under 35 U.S.C. 154(b) by 395 days.

(21) Appl. No.: 09/927,398

(22) Filed: Aug. 13, 2001

(65) Prior Publication Data

US 2002/0029329 A1 Mar. 7, 2002

Related U.S. Application Data

(63) Continuation of application No. 09/228,550, filed on Jan. 12, 1999, now abandoned.

(30) Foreign Application Priority Data

Jan. 13, 1998 (KR) .................................................. 98-735

(51) Int. Cl.⁷ ................................................ G06F 9/30
(52) U.S. Cl. ...................................... 712/208; 713/190
(58) Field of Search ......................... 712/43, 208–209, 712/211; 713/190

(56) References Cited

U.S. PATENT DOCUMENTS

| | | | | |
|---|---|---|---|---|
| 3,990,052 A | | 11/1976 | Gruner | |
| 4,306,289 A | * | 12/1981 | Lumley | 713/190 |
| 4,433,207 A | * | 2/1984 | Best | 713/190 |
| 4,633,388 A | * | 12/1986 | Chiu | 712/208 |
| 4,764,959 A | | 8/1988 | Watanabe et al. | |
| 5,524,166 A | * | 6/1996 | Osaka et al. | 385/134 |
| 5,596,739 A | | 1/1997 | Kane et al. | |
| 5,829,012 A | | 10/1998 | Marlan et al. | |
| 6,044,157 A | * | 3/2000 | Uesaka et al. | 380/201 |
| 6,141,740 A | | 10/2000 | Mahalingaiah | |

* cited by examiner

*Primary Examiner*—Stacy A. Whitmore
(74) *Attorney, Agent, or Firm*—Birch, Stewart, Kolasch & Birch, LLP

(57) ABSTRACT

An instruction decoding unit in a microcomputer is disclosed having an instruction word capable of being selected by a user to conveniently produce application software while maintaining security. The decoding unit in a microcomputer includes an instruction register for storing instructions fetched from a memory, an instruction decoder for decoding instruction codes of the instructions stored in the instruction register and for designating micro-instructions to be executed, a micro-ROM for outputting a series of the micro-instructions designated by the instruction decoder, and a user instruction selector for selecting or changing the micro-instructions of the micro-ROM in response to user's selection so as to change the operation of an instruction word.

4 Claims, 3 Drawing Sheets

USER INITIATED MICROCODE MODIFICATION

This application is a continuation of application Ser. No. 09/228,550, filed on Jan. 12, 1999, now abandoned the entire contents of which are hereby incorporated by reference and for which priority is claimed under 35 U.S.C. § 120; and this application claims priority of application No. 98-00735 filed in Korea on Jan. 13, 1998 under 35 U.S.C. § 119.

BACKGROUND OF THE INVENTION

1. Field of the Invention

The present invention relates to a microcomputer and its use, and more particularly, to an instruction decoding unit in a microcomputer having an instruction word capable of being selected by a user and a method of encoding/decoding the instruction word.

2. Discussion of the Related Art

Generally, a microcomputer includes a central processing unit (CPU), a memory, peripheral units, and an input/output unit on a chip. Recently, microcomputers have been widely used in household electric appliances, office automation machines, industrial electric machines, and the like.

The microcomputer allows the CPU to process instructions and data from a memory storing application software selected by a user, and controls the peripheral units and the input/output unit.

An instruction decoding unit in a conventional microcomputer will be described with reference to the accompanying drawings.

FIG. 1 is a block diagram illustrating an instruction decoding unit in a conventional microcomputer.

As shown in FIG. 1, the instruction decoding unit in the conventional microcomputer includes an instruction register 11 for storing instructions fetched through a data bus from a memory that stores application software selected by a user, an instruction decoder 12 for decoding the instructions stored in the instruction register 11 and for designating micro ($\mu$)-instructions to be executed, and a micro read only memory ($\mu$-ROM) 13 for outputting a series of the micro-instructions (combination of control signals) designated by the instruction decoder 12.

The operation of the instruction decoding unit in the conventional microcomputer will be described below.

The instruction register 11 stores the instructions fetched from the memory, which stores application software selected by the user, through the data bus. The instruction register 11 outputs the instructions to the instruction decoder 12, if necessary.

The instruction decoder 12 receives the instructions from the instruction register 11 and a signal NXA from the micro-ROM 13 for designating the next micro-instructions, and designates the micro-instructions of the micro-ROM 13 that are to be executed. That is, a command address from micro-ROM 13 contains the signal NXA, which is used to designate a next instruction code.

The micro-ROM 13 receives the micro-instructions designated from the instruction decoder 12 and outputs the signal NXA for designating the micro-instructions to be output in the next cycle, and outputs the micro-instructions.

The micro-instructions of the micro-ROM 13 are input to an arithmetic and logic unit (ALU) and various registers, none of which are shown, to perform designated functions.

However, the instruction decoding unit in the conventional microcomputer has several problems.

First, since the conventional microcomputer has fixed instruction sets, it may be impossible for the user to designate a desired instruction word set.

Second, when a program code of the user is open, it is easy to decode the program code using a fixed instruction map, thereby likely causing security problems for the program.

Finally, when the user produces application software, it is sometimes impossible to designate an instruction word that is frequently used by the user.

SUMMARY OF THE INVENTION

The present invention is directed to an instruction decoding unit in a microcomputer that substantially obviates one or more of the problems due to limitations and disadvantages of the related art.

An object of the present invention is to provide an instruction decoding unit in a microcomputer having an instruction word capable of being selected by a user to conveniently produce application software and maintain security.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an instruction decoding unit in a microcomputer according to the present invention includes an instruction register for storing instructions fetched from a memory, an instruction decoder for decoding instruction codes of the instructions stored in the instruction register and designating micro-instructions to be executed, a micro-ROM for outputting a series of the micro-instructions designated by the instruction decoder, and a user instruction selector for selecting or changing the micro-instructions of the micro-ROM in response to user's selection so as to change the operation of an instruction word.

In another aspect, an instruction decoder in a microcomputer includes an instruction register for storing instructions fetched from a memory, an instruction decoder for decoding instruction codes of the instructions stored in the instruction register and designating micro-instructions to be executed, an instruction code selector connected between the instruction register and the instruction decoder, for allowing a user to select a signal for a plurality of instruction maps, a micro-ROM for outputting a series of the micro-instructions designated by the instruction decoder, and a user instruction selector for selecting or changing the micro-instructions of the micro-ROM in response to user's selection so as to change the operation of an instruction word.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and, together with the description, serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
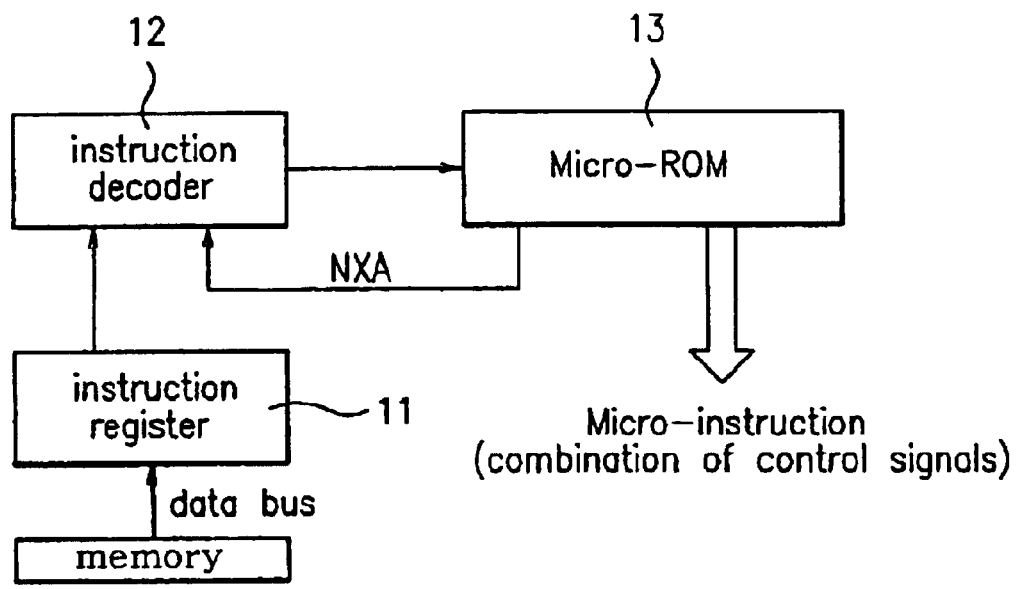
FIG. 1 is a block diagram illustrating an instruction decoding unit in a conventional microcomputer.
Figure 2:
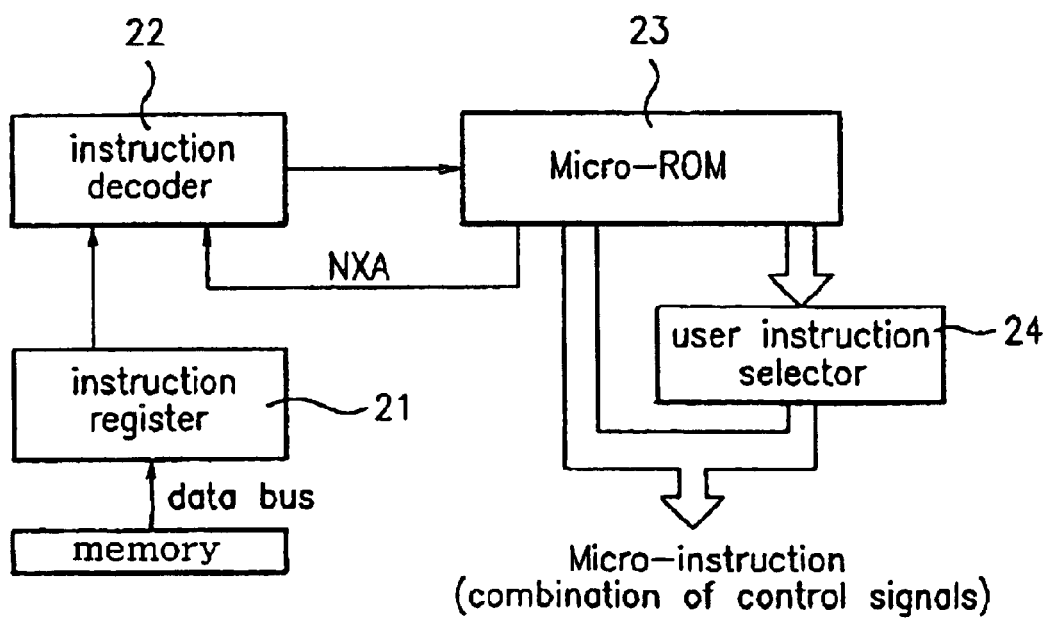
FIG. 2 is a block diagram illustrating an instruction decoding unit in a microcomputer according to the first embodiment of the present invention.

FIG. 2 is a block diagram illustrating an instruction decoding unit in a microcomputer according to the first embodiment of the present invention.

As shown in FIG. 2, an instruction decoding unit in a microcomputer according to the first embodiment of the present invention includes an instruction register 21 for storing instructions fetched through a data bus from a memory in which application software selected by a user, an instruction decoder 22 for decoding instruction codes corresponding to the instructions stored in the instruction register 21 and for designating micro-instructions to be executed, a micro-ROM 23 for outputting a series of the micro-instructions (combination of control signals) from micro-instruction signals designated by the instruction decoder 22, and a user instruction selector 24 for selecting or changing the micro-instructions from the micro-ROM 23 in response to a user selection so as to change the operation of an instruction word.

Figure 3:
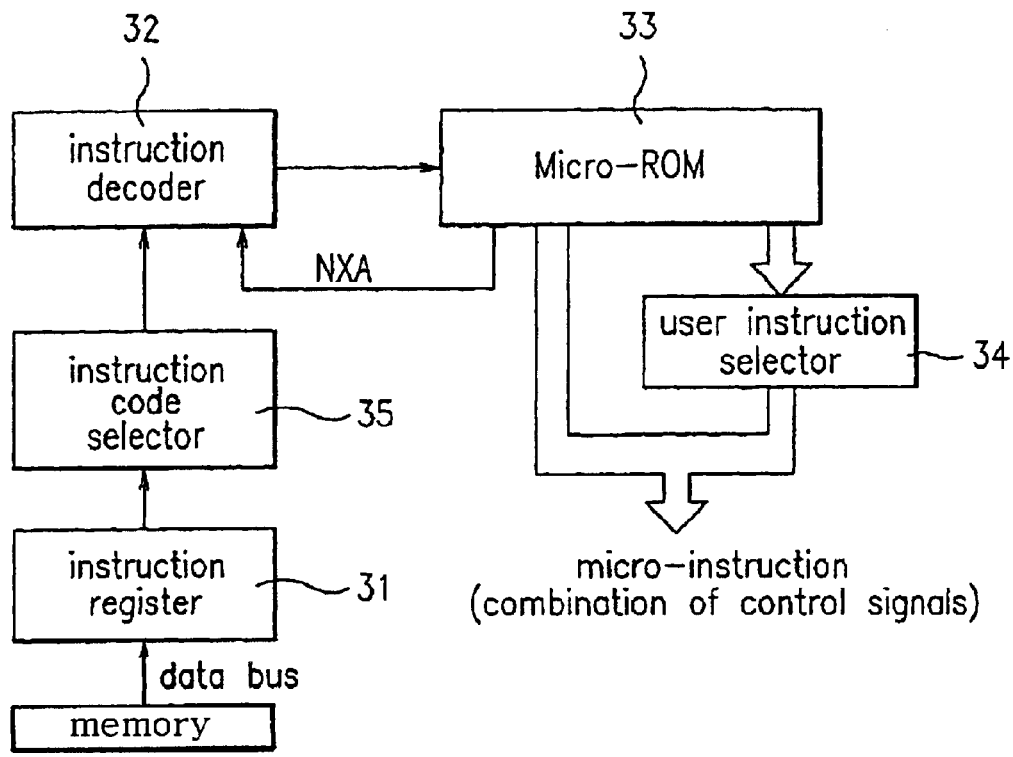
FIG. 3 is a block diagram illustrating an instruction decoding unit in a microcomputer according to the second embodiment of the present invention.

FIG. 3 is a block diagram illustrating an instruction decoding unit in a microcomputer according to the second embodiment of the present invention.

As shown in FIG. 3, an instruction decoding unit in a microcomputer includes an instruction register 31 for storing instructions fetched through a data bus from a memory in which application software selected by a user is stored, an instruction decoder 32 for decoding instruction codes corresponding to the instructions stored in the instruction register 31 and for designating micro-instructions to be executed, an instruction code selector 35 connected between the instruction register 31 and the instruction decoder 32 for allowing a user to select a signal corresponding to at least one of a plurality of instruction maps, a micro-ROM 33 for outputting a series of the micro-instructions (combination of control signals) designated by the instruction decoder 32, and a user instruction selector 34 for selecting or changing the micro-instructions of the micro-ROM 33 in response to a user selection so as to change the operation of an instruction word. Instruction decoder 32 includes an instruction map (not shown). The mask option is an option in which a selection switch may or may not be connected in advance using metal. A particular register is used for selecting one of three (increase, decrease, inversion) (this is an example of selection method). Although the order of the original instruction rarely needs to be recovered, a conversion code may be established/selected by a user or manufacturer to allow simplified deciphering of instructions by decoder 32 and micro-ROM 33 after bits have been rearranged by instruction code selector 35.

Figure 4:
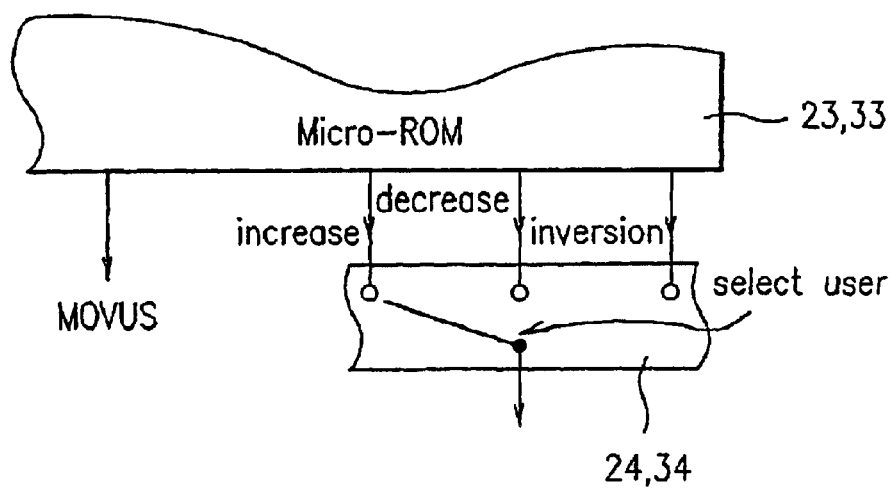
FIG. 4 shows functions of a user instruction selector according to the present invention.

FIG. 4 shows functions of the user instruction selectors (e.g., 24 and 34 of FIGS. 2–3) according to the present invention.

As shown in FIG. 4, it is assumed that an instruction word such as MOVUS, which enables contents of a particular memory to be fetched to another particular memory, is stored within the micro-ROMs 23 and 33. The instruction word, MOVUS, allows the user to select or change (increase, decrease, and invert) data selectively fetched by the user using the user instruction selectors 24 and 34. For example, using the instruction word MOVUS, it is possible for user "A" to select an automatic increase of data and for user "B" to select automatic decrease of data. As such, if D denotes the MOVUS, the micro-instruction will be D+1 when the user selects an increase, D−1 when the user selects a decrease, and $\overline{D}$ when the user selects inversion. In this regard, the user can customize the instruction word.

The user instruction selectors 24 and 34 allow the user to select the instruction word using a mask option or a particular register. Specifically, the instruction map is selected by map selecting bits determined according to a number of maps. For example, as the map selecting bit has 2 bits in the present invention, four maps (0, 1, 2 and 3) can be selected.

Figure 5:
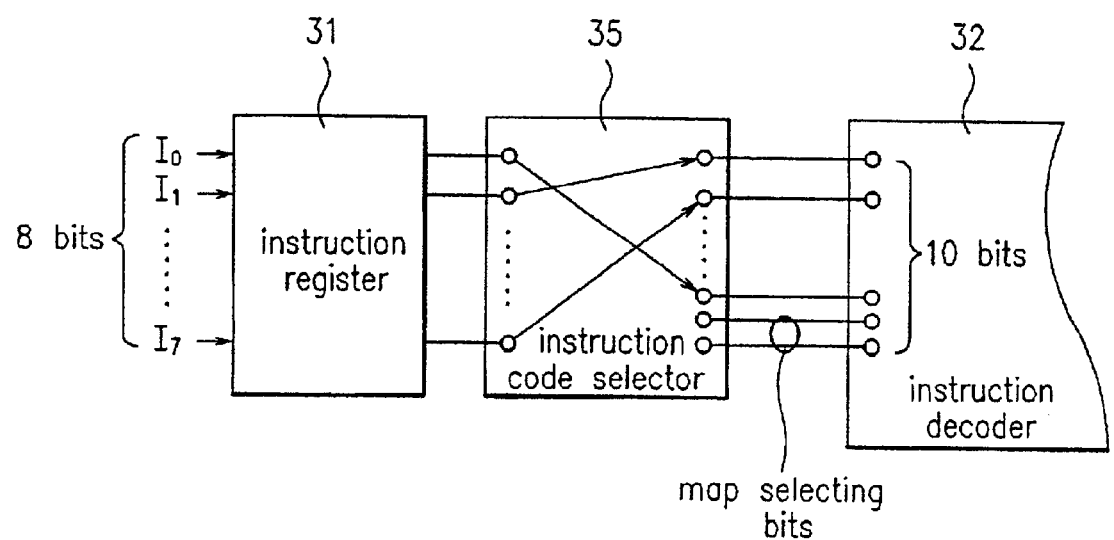
FIG. 5 shows functions of an instruction code selector according to the present invention.

FIG. 5 shows functions of the instruction code selector according to the present invention.

As shown in FIG. 5, the instruction code selector 35 receives 8-bit data instructions from the instruction register 31, and outputs those data instructions with two or more map selecting bits. The resulting data, which includes two or more instruction map selecting bits and 8-bit data instructions, is input to the instruction decoder 32. In this manner, the user selects a desired instruction set among a plurality of instruction sets. In addition, to recognize the instruction as a code different from actual executive instruction code output from register 31, instruction code selector 35 changes the relative positions of bits in the received data instructions based on a selected instruction map corresponding to the map selecting bits appended to the end of the output from instruction code selector 35. In other words, the security of a program can be maintained even if the user application code in the memory becomes exposed after instruction code selector 35.

Some of the advantages achieved through the instruction decoding unit in the microcomputer according to the present invention are described hereinafter.

First, the user can customize the instruction word having a particular function to conveniently produce application software and maintain security.

Second, the user can select a desired one among a plurality of the instruction maps customized by the user through the instruction code selector.

Third, security of the application program can be improved by changing the bit position of the instruction word.

It will be apparent to those skilled in the art that various modifications and variations can be made in the instruction decoding unit in the microcomputer according to the present invention without departing from the spirit or scope of the invention. Thus, it is intended that the present invention covers the modifications and variations of the invention provided they come within the scope of the appended claims and their equivalents.

What is claimed is:

1. An instruction decoding unit in a microcomputer comprising:

an instruction register storing instructions fetched from a memory;

an instruction decoder decoding instruction codes of the instructions stored in the instruction register and designating micro-instructions to be executed;

an instruction code selector, connected between the instruction register and the instruction decoder, allowing a user to select a signal corresponding to at least one of a plurality of instruction maps wherein said instruction code selector is operable to encrypt instruction code;

a micro-ROM outputting a series of the micro-instructions designated by the instruction decoder; and a user instruction selector selecting or changing the micro-instructions of the micro-ROM in response to a selection by a user so as to change the operation of an instruction word.

2. The instruction decoding unit in a microcomputer as claimed in claim 1, wherein the user instruction selector selects the instructions using a mask option or a particular register.

3. The instruction decoding unit in a microcomputer as claimed in claim 1, wherein the plurality of instruction maps are two or more.

4. An instruction decoding unit in a microcomputer, comprising:

an instruction code selector generating encrypted instructions by manipulating received instructions;

a decoder decoding instructions corresponding to encrypted instructions received from the instruction code selector; and a user instruction selector selecting or changing the instructions decoded by the decoder in response to selection by a user.

* * * * *